UNITED STATES PATENT OFFICE 1,979,781

METHOD OF MAKING EDIBLE SUGAR SYRUP

August L. van Scherpenberg, Tirlemont, Belgium

No Drawing. Application February 11, 1931, Serial No. 515,136. In the Netherlands November 30, 1929

2 Claims. (Cl. 127—30)

The object of this invention is making a palatable, edible sugar syrup (by which I also understand sugar syrup adapted, either or not after suitable treatment, as a component of such edible syrup) from raw sugar, either beet or cane, or from syrup made of raw sugar, or from equivalent syrup, i. e. syrup composed substantially of saccharose, molasses and water but not mixed with glucose syrup, or with invert sugar syrup.

With this object in view I suggest to dissolve the raw sugar, or the syrup made of raw sugar, or the equivalent syrup, as the case may be, in water and add active carbon (also called adsorption charcoal, or activated carbon, or decolorizing carbon) thereto, thereafter thoroughly stir the mass thus obtained while heating it during a suitable, relatively short time to a temperature exceeding 100° C., and finally remove the said carbon from the mass, preferably by filtering it off.

I have found that a solution of raw sugar of 60° Brix, to which an amount of 1 to 2% by weight of active carbon known in the trade under the name of Norit, has been added, if heated in an autoclave during 15 minutes to a temperature of 134° C., is changed in such a manner that the objectionable flavor, which renders raw sugar unsuitable for consumption, is eliminated and replaced by a flavor much like that of honey. Bone char may be considered as an equivalent of active carbon, although its effect on the flavor of the syrup under consideration is slightly different.

Should the concentration be raised to say 80° Brix, it would be difficult to remove the active carbon after treatment, since this solution is too viscous.

From edible syrup made in accordance with my present invention, sugar is sometimes liable to crystallize, but this can be met in known manner by the addition to the said syrup of invert sugar syrup.

What I claim is:—

1. A method of making edible sugar syrup, which consists in preparing an aqueous solution of raw sugar having a concentration between 60 and 80° Brix, adding to said solution active carbon in an amount from trace to 3%, stirring and heating the mixture thus obtained under pressure to a temperature exceeding 120° C. during less than half an hour and removing the carbon from said mixture.

2. A method of making edible sugar syrup, which consists in preparing a solution containing saccharose and molasses having a concentration of the order of 60° Brix, adding active carbon to said solution, stirring and heating the mixture thus obtained under pressure to a temperature exceeding 100° C. and removing the carbon from said mixture.

AUGUST L. van SCHERPENBERG.